3,554,974
ELASTOMERIC LINEAR POLYURETHANE FILAMENT FORMED WITH CHAIN EXTENSION AGENT COMPRISING DIALKYLENE-TRIAMINE/ALDEHYDE REACTION PRODUCT

Henri A. Mommaerts, 17 Rue Paul Emile Janson, Brussels, Belgium, and Wilfried J. Melaerts, Kruiskensveld, 2 Halle, Essen Beek, Belgium
No Drawing. Filed Mar. 4, 1968, Ser. No. 709,961
Claims priority, application Great Britain, Mar. 3, 1967, 10,165/67
Int. Cl. C08g 9/04
U.S. Cl. 260—72                            3 Claims

ABSTRACT OF THE DISCLOSURE

The present invention is concerned with new, linear polymeric urethanes of the elastomeric type with an improved dyestuff affinity and is also concerned with the production thereof.

SUMMARY OF THE INVENTION

The new elastomeric, linear polymeric urethanes according to the present invention are the products of the reaction between a prepolymer having terminal isocyanate groups and a chain extension agent obtained by the reaction of a dialkylene-triamine of the general formula:

$$H_2N-R'-NH-R''-NH_2$$

wherein R' and R", which may be the same or different, are straight chain or branched alkylene radicals containing up to 4 carbon atoms, with an aldehyde of the general formula R·CHO, in which R is a hydrogen atom or an alkyl, aryl, aralkyl or heterocyclic radical, in a molecular ratio of between 1:0.8 and 1:1.2, preferably 1:0.9 to 1:1.1.

DETAILED DESCRIPTION

The elastomeric, linear polyurethanes with an elongated chain, known as segmented polyurethanes because of the presence in the chain of rigid segments and of flexible segments, are used in numerous sectors of industry for the production of various formed articles exhibiting a high elasticity, such as filaments, fibers, coatings and films.

Such formed articles, especially elastomeric filaments and fibers, cannot be dyed easily and intensively with known dyestuffs usually employed.

If the elastomeric filaments and fibers have a sufficient dyestuff affinity, the dyed filaments and fibers must also possess good fastness properties with regard to washing, soaping, light and other effects and, in addition, possess stable mechanical properties. According to the known technology, the problem of the dyestuff affinity of elastomeric filaments and fibers of linear segmented polyurethanes was resolved by an appropriate choice of the starting materials used for the production of the polymers.

It is known from Belgian patent specification No. 616,044 to use, in the course of the reaction for the extension of the chain of prepolymerized urethane, a diamine of the general formula:

$$H_2N-R-N-R-NH_2$$
$$\phantom{H_2N-R-N}|$$
$$\phantom{H_2N-R-N}R'$$

in which R is an alkylene radical containing up to 4 carbon atoms and R' is an alkyl radical containing up to 4 carbon atoms, especially N-methyl-bis-(3-aminopropyl)-amine.

Belgian patent specification Nos. 664,344 and 664,346 are concerned with elastomeric polyurethanes having a recurrent unit characterized, on the one hand, by a tertiary nitrogen atom and, on the other hand, by a minimum of two tertiary nitrogen atoms.

Among the agents for the elongation of the chains, there are mentioned, respectively, the alhydrazide of piperazine-N,N'-bis-(propionic acid) and the piperazine-N,N'-bis-(γ-propylamines), for example, 1,4-bis-(3-aminopropyl)-piperazine. These chain elongation agents may also be used in the presence of other chain elongation agents.

According to Belgian patent specification No. 668,477, the coagent for the extension of the chain is a diol, such as N-methyl-bis-(2-hydroxy-propyl)amine, N,N'-bis-(hydroxyethyl)-piperazine and N,N'-diethyl-N,N'-bis-(β-hydroxypropyl)-propylene-1,3-diamine.

Belgian patent specification No. 671,062 mentions the use of a coagent for the elongation of the chain containing at least one SO₃M group or a sulphone imide group of the general formula:

$$-SO_2-H-SO_2-$$
$$\phantom{-SO_2-H}|$$
$$\phantom{-SO_2-H}M$$

in which M is a hydrogen or alkali metal atom or an ammonium group.

According to Belgian patent specification No. 679,995, the improvement of the dyestuff affinity of polyurethanes is obtained by using, as coagent for the elongation of the chains, basic polyethers having tertiary nitrogen atoms which may be quaternized up to an amount of 90% by monofunctional sulphuric acid esters, aromatic sulphonic acid esters or other compounds.

These various known techniques suffer from the disadvantage of using organic compounds which are relatively complex and difficult to obtain commercially. Furthermore, the properties of resistance and of fastness of the dyeings to soaping, washing, light and other effects are not always sufficient.

It is an object of the present invention to provide new elastomeric, polymeric linear polyurethanes with improved dyeing properties and an improved capacity to retain the dyestuffs, while maintaining unchanged the other properties, such as the mechanical properties.

It is a further object of the present invention to provide formed products, especially elastomeric filaments and fibers, which can be dyed in dark shades with the use of known dyestuffs, such as the acid dyestuffs, which may be dispersed, metallized and chromed, while giving an improved fastness of the dyeings to soaping, washing, light and other effects.

The new elastomeric, linear polymeric urethanes according to the present invention are the products of the reaction between a prepolymer having terminal isocyanate groups and a chain extension agent obtained by the reaction of a dialkylene-triamine of the general formula:

$$H_2N-R'-NH-R''-NH_2$$

wherein R' and R", which may be the same or different, are straight chain or branched alkylene radicals containing up to 4 carbon atoms, with an aldehyde of the general formula R.CHO, in which R is a hydrogen atom or an alkyl, aryl, aralkyl or heterocyclic radical, in a molecular ratio of between 0.8 and 1.2, preferably 0.9 and 1.1.

According to one embodiment of the present invention, the chain extension agent may be the reaction product of 1 mol of dipropylene-triamine of the formula:

$$H_2N-(C_3H_6)-NH-(C_3H_6)-NH_2$$

or of 1 mol of diethylene-triamine of the formula:

$$H_2N-(C_2H_4)-NH-(C_2H_4)-NH_2$$

with 0.8 to 1.2 mol, preferably 0.9 to 1.1 mol, of an aldehyde of the general formula R.CHO, in which R is a hydrogen atom or an alkyl, aryl, aralkyl or heterocyclic radical.

Among the aldehydes which may be used according to the present invention, there may be mentioned, by way of example, formaldehyde, acetaldehyde, propionaldehyde, butyraldehyde, benzaldehyde, isobutyraldehyde and salicylaldehyde. These aldehydes may be used alone or in admixture with one another.

By way of example, there are given hereinafter methods for the preparation of reaction products of dialkylene-triamines with aldehydes, these products being used as agents for the extension of the chain of prepolymerized urethanes.

PREPARATION OF A REACTION PRODUCT OF DIPROPYLENE - TRIAMINE WITH FORMALDEHYDE 131.24 g. dipropylene-triamine (corresponding to 1 mol) are weighed exactly into a 400 ml. beaker. The beaker is placed in an ice bath and provided with a magnetic stirrer. While stirring, the temperature of this reactant drops to 10° C.

Furthermore, 84.23 g. of an aqueous 35.65% by weight solution of formaldehyde (corresponding to 1 mol of formaldehyde) are weighed exactly into a 250 ml. beaker. This formaldehyde solution is introduced very slowly, drop by drop, into the cooled dipropylene-triamine and stirred vigorously. Since the reaction is exothermal, it is necessary to regulate the rate of addition of the formaldehyde solution and possibly to interrupt it in order to prevent a significant increase in temperature in such a manner that it does not exceed 20° C.

After completion of the addition of the formaldehyde to the triamine, the reaction product is ready for use as a chain extension agent for urethane prepolymers.

PREPARATION OF A REACTION PRODUCT OF DIETHYLENE-TRIAMINE WITH FORMALDEHYDE

The method of preparation is similar to that described for the reaction product of dipropylene-triamine with formaldehyde, having regard to the different molecular weight of diethylene-triamine: 103.18 g. diethylene-triamine, in a practically pure state (corresponding to 1 mol) are reacted with 84.23 g. of a 35.65% by weight aqueous solution of formaldehyde or with 30.03 g. of pure formaldehyde (corresponding to 1 mol). The solution obtained after the complete reaction of the formaldehyde with the diethylene-triamine, is used as such for the reaction for extending the chain of urethane prepolymers.

The dialkylene-triamines of the general formula:

$$H_2N-(CH_2)_n-NH-(CH_2)_n-NH_2$$

in which $n$ is 1, 2, 3 or 4, cannot be used as agents for the extension of the chain of urethane prepolymers with terminal isocyanate groups because of the presence in the molecule of three reactive sites. Such compounds bring about the immediate formation of gels and of insoluble gelled structures which cannot be used for the preparation of solutions for making, for example, filaments.

It is therefore, surprising to find that the replacement of the dialkylene-triamines mentioned above by their reaction products with aldehydes for use as chain extension agents, permit, by reaction with the prepolymers having terminal isocyanate groups, the production of linear segmented polyurethanes or of solutions containing them, without gel formation.

Such polymers or their solutions in conventional solvents, such as dimethyl formamide, dimethyl acetamide, dimethyl sulphoxide or other known solvents, are particularly suitable for the production of elastomeric filaments or fibers.

The formed products obtained from such polyurethanes exhibit superior dyeing properties, while the other characteristics, such as the mechanical characteristics in the case of elastomeric filaments, remain unchanged.

The dyeing experiments with acidic dyestuffs were carried out as follows.

(a) Preparation of the filament

There are prepared 3 g. skeins of polyurethane filament which has possibly been previously degreased.

(b) Prepartion of the dyebath (1) Experiment at saturation.—4.8 g. Alizarin Solid Blue R are weighed out and pasted with hot distilled water to which has been added a little acetic acid. 360 mg. Alkanol LN, used as wetting agent, are dissolved separately in a little hot distilled water and this solution used for continuing the pasting of the dyestuff.

When the dyestuff has been well pasted, it is placed in a graduated flask, made up to 1 litre and the pH adjusted to 5 by the addition of distilled water and acetic acid.

(2) "Industrial" experiment.—The method of operation is the same as in (1) but using 1.2 g. Alizarin Solid Blue R.

(c) Dyeing procedure 125 ml. of each of the dystuff solutions obtained in (b) are used per 3 g. skein, thus giving a dyestuff/fiber ratio of 20:100 and 5:100, respectively. The solution is first introduced into a dyeing tube surmounted by a reflux condenser column and heated to 50° C. At that moment, the sample skein is introduced and the whole continuously agitated. The bath is slowly heated to 100° C. within the course of 45 minutes and the temperature maintained at 100° C. for 1.5 hours.

Thereafter, the sample is removed and rinsed first with hot water and then with cold water. The sample is subsequently dried at 50–60° C. in a ventilated drying cabinet. The quantity of dyestuff fixed by the fiber is obtained by the determination of the final concentration of the dyestuff in the exhausted dyebath. This concentration may be determined by a known spectrophotometer.

The nature of the reaction products according to the present invention has not been completely elucidated.

The formation is known of Schiff's bases by the reaction between aldehydes and amines:

$$R.CHO + H_{2N.R1} \quad R.CH + NR_1 + H_2O$$

The formation is very rapid in the presence of an excess of amine and several authors have considered it as a way of measuring aldehydes.

Certain difficulties of reversibility of the reaction at the end of the titration of the excess amine by acid appear to be overcome according to the report of Sidney Siggia (Quantitative Organic Analysis, 2nd edition, 1958, pub. Wiley) who recommended the use of salicylic acid for the measurement of formaldehyde and of some aromatic aldehydes.

When it is a question of the reaction product of dialkylene-triamines with aldehydes, as in the case of the present invention, the situation is complicated by the polyfunctionality of the amine but it is reasonable to suppose that there is obtained the Schiff base corresponding to the aldehyde used or its intermediate hydroxyl product. This interpretation, which is clearly not intended to limit the scope of the present invention, is the very probable since the proportion of aldehyde used is of the order of about one mol per one mole of amine and since greater proportions of the aldehyde are conducive for the formation of polymers which are useless as chain extension agents in the production of linear segmented polyurethanes.

These reaction products may be used alone or in admixture with one or more other chain extension agents of known kind.

For example, as a second chain extension agent, there may be used a diamine or a glycol or another agent containing at least two active hydrogen atoms.

Among the diamines which may be used in admixture with the reaction products of dialkylene-triamine with aldehydes, there may be mentioned, by way of example, ethylene-diamine, propylene-diamine, tetramethylene-diamine, p-xylylene-diamine, p-phenylene-diamine, hydrazine and the like and among the glycols, there may be mentioned, by way of example, ethylene-glycol, hexamethylene-glycol, diethylene-glycol and the like.

A large variety of prepolymers may be used according to the present invention. The preferred compound which contain active hydrogen and can be used for the preparation of the prepolymers, include polyalkylene ether glycols, polyester glycols, polyamide glycols, polyacetal glycols and/or mixtures thereof.

The macro-glycols which are preferably used for making the prepolymers to be employed according to the present invention, have a molecular weight between 500 and 5000, preferably between 1000 and 3000. In order to obtain the best results, those glycols or mixtures thereof used have a melting point below 60° C.

As examples of polyether glycols which may be used for making the prepolymers, there may be mentioned polypropylene ether glycol, polytetramethylene glycol, polypropylene-ethylene ether glycol, polyhexamethylene ether glycol and polymonomethylene ether glycol. Polyethylene ether glycol is frequently used in admixture with other polyether or polyester glycols; it is rarely used alone because of its relatively high solubility in water.

The polyester glycols which can be used for making the prepolymers can be prepared by reacting appropriate quantities of a glycol of low molecular weight with a dicarboxylic acid, a chloride of a diacid or a diester. As examples of glycols which may be used, there are mentioned ethylene-glycol, propylene-glycol, tetramethylene-glycol, neopentyl-glycol, xylylene-glycol and hexame-glycol. The dicarboxylic acids used for making the polyester-glycols include, for example, succinic acid, adipic acid, suberic acid, sebacic acid, azelaic acid and terephthalic acid. The mixed polyester-glycols formed when using mixtures of glycols and/or of dicarboxylic acids of low molecular weight, may also be used.

In the same way, polyacetal glycols may be used and these are prepared by the reaction of polyhydric alcohols, for example, butane-1,4-diol, hexane-1,6-diol, butane-1,4-diol di-($\beta$-hydroxy ethers) or ethylene-glycol, with an aldehyde, for example, formaldehyde, paraformaldehyde, acetaldehyde, crotonaldehyde or chloral.

There may also be used polyester-amides containing hydroxyl groups. These are obtained from the diols, polyalcohols, diamines or amine-alcohols mentioned above, by condensation with polycarboxylic acids, acid-alcohols or amino-carboxylic acids. These polyesteramides may be prepared, for example, from succinic acid, adipic acid or sebacic acid by reaction with ethylene-diamine or hexamethylene-diamine and a diol, such as ethylene-glycol.

The diisocyanate used for the preparation of the prepolymers may be aromatic, aliphatic or cycloaliphatic.

The aromatic diisocyanate, i.e., those diisocyanates in which the isocyanate groups are attached directly to the nuclear aromatic structures, are preferably used because of their generally high speed of reaction.

Among the diisocyanates which may be used according to the present invention, there may be mentioned, by way of example, the tolylene diisocyanates, p-phenylene diisocyanate, methylene-bis-(4-phenyl-isocyanate), hexamethylene-1,6-diisocyanate and cyclohexylene-1,4-diisocyanate. Mixtures of diisocyanates may also be used.

The following examples are given for the purpose of illustrating the present invention.

EXAMPLE 1

(a) Preparation of the prepolymer

Into a round-bottomed, 3-litre flask, there are weighed 900 g. of a polymerized propylene glycol adipate having terminal hydroxyl groups and a molecular weight of 2000 and 300 g. of polypropylene glycol with a molecular weight of 2000.

The flask is placed in a heating mantle provided with means for controlling the heating.

The flask is provided with a stopper containing 4 orifices intended for a stainless steel stirrer, a thermometer, the supply of dry nitrogen and a tube intended for the introduction of other reactants.

The mixture is brought to 60° C. and homogenized by stirring at 200 r.p.m. Thereafter, there are introduced into the mixture, all at once, 300 g. methylene-bis-(4-phenyl-isocyanate) and the rate of stirring reduced to 100 r.p.m. When the structure is homogeneous, the temperature is progressively raised to 80° C. within the course of about 30 minutes. Heating is subsequently discontinued. The temperature increases to 100° C. as a result of the exothermal reaction. This temperature (98–100° C.) is maintained for 1.5 hours by controlling the heating.

After this period of reaction, a sample removed for the determination of the terminal isocyanate groups present shows a concentration of isocyanate groups of $80 \times 10^{-5}$ equivalents/g.

The flask is removed from the heating mantle and cooled, while stirring and under nitrogen, in a waterbath to a temperature of 60° C.

To the prepolymer thus obtained, there are added 400 g. dimethyl formamide. The solution is stirred for 15 minutes in such a manner as to obtain a good homogeneity.

(b) Extension of the prepolymer chains

Into a 10 litre container there are introduced 4719.1 g. dimethyl formamide, 10.77 g. of a reaction product of 1 mol dipropylene-triamine and 1 mol formaldehyde, such as that described hereinbefore (corresponding to 0.05 mol of reaction product), 27.045 g. ethylene-diamine (0.45 mol) and 2.628 g. diethanolamine in the form of a 1% solution in dimethyl formamide (0.025 mol).

The solution of amines thus repared is agitated by means of a stirrer rotating at 500 r.p.m. The solution of the prepolymer prepared in (a) above is slowly added to the solution of amines at a rate of 50 g./minute.

The speed of stirring is progressively increased to 900 r.p.m. in order to ensure sufficient agitation of the reaction medium as the viscosity increases.

The addition of the prepolymer is stopped after 1601.56 g. of the prepolymer solution have been introduced.

(c) Spinning

The solution of segmented polyurethane obtained according to (b) is spun into an aqueous spinning bath containing 15% dimethyl formamide and having a temperature of 90° C. The filaments are stretched 50%, washed, treated in an oven at a temperature of 180° C. and finally wound on to a spool at a rate of 35 m./minute.

(d) Properties of the filaments

The dyeing test described hereinbefore was applied to the filaments obtained according to this example and on filaments obtained by the same method but with the replacement of the chain extending agent according to the present invention by N-aminoethyl-piperazine, all other conditions remaining unchanged.

This latter diamine was chosen as comparison because its molecule also only contains one tertiary nitrogen atom.

The comparison filaments, submitted to a dyeing experiment at saturation (use of a bath having 20% Alizarin Solid Blue R referred to the weight of the fiber) and to a so-called "industrial" dyeing experiment (using a bath having 5% Alizarin Solid Blue R referred to the weight of the fiber), gave a pale coloration, while the filaments obtained according to Example 1 are characterized by a deep shade.

Furthermore, as can be seen from the following table, no impairment of the mechanical characteristics are observed for the filaments of Example 1 submitted to dyeing with Alizarin Solid Blue R, which is an acidic dyestuff.

TABLE I

| Characteristics | Undyed sample | Undyed and degreased sample | Dyed sample |
| --- | --- | --- | --- |
| Textile titre | 104 | 111 | 116 |
| Breaking load (g.) | 450 | 482 | 493 |
| Strength g./tex | 4.3 | 4.3 | 4.27 |
| Breaking elongation | 596 | 674 | 707 |

The tests of fastness to light, normal washing (60° C. in the presence of carbonate), perspiration, sea water, chlorinated water (0.5 g./litre of active chlorine; pH= ~10.3) and application to the filament of acid dyestuffs other than Alizarin Solid Blue R, showed the interesting behavior of these filaments.

Stability:　Filaments dyed with acid dyestuffs
　Light _____ fastness was good to very good
　Washing at 60° C. __ fastness was good to excellent
　Perspiration _____ fastness was good to excellent
　Sea water _____ fastness was good to very good
　Chlorine _____ fastness was good to excellent

EXAMPLE 2

The prepolymer prepared according to Example 1 is reacted with 107.74 g. of the reaction product of 1 mol dipropylene-triamine and 1 mol formaldehyde, such as is obtained according to the method described hereinbefore (corresponding to 0.5 mol of reaction product), this being used as the only chain extension agent.

The process of extending the chain, the spinning of the polyurethane obtained, the dyeing tests on the filaments, the determination of the mechanical properties and the stability of the dyeing are analogous to those mentioned in Example 1.

The percentage of the dyestuff fixed to the fiber increases by 1.2% in the case of the so-called "industrial" dyeing (use of a bath having 5% Alizarin Solid Blue R referred to the weight of the fiber).

This quantity of dyestuff fixed is slightly better to an extent of 0.1% than that fixed by a fiber obtained according to the same conditions of preparation and spinning but with the replacement of the chain extension agent used in Example 2 by N-methylamino-bis-propylamine, which is considered to be a satisfactory chain extension agent.

EXAMPLE 3

This example makes use of the conditions set out in Example 1 with the exception that the chain extension agent used is one in which the formaldehyde has been replaced by acetaldehyde in a corresponding molar quantity.

The filaments obtained, submitted to the same dyeing tests, gave a satisfactory dyeing level, comparable with that obtained in Example 1.

The quantity of dyestuff fixed by the fiber in the so-called "industrial" dyeing test increased by 1.8%. This value is very much better than that obtained for the comparison fiber (1.1%) obtained in the manner described in Example 2.

EXAMPLE 4

The acetaldehyde used in Example 3 was replaced, respectively, by propionaldehyde, butyraldehyde and benzaldehyde, in corresponding molar quantities. The solutions of linear segmented polyurethanes resulting from the use of these products as chain extension agents, spun according to the conditions set out in Example 1, gave filaments characterized by improved dyeing properties.

The quantity of dyestuff fixed to the fibers submitted to the so-called "industrial" dyeing test is close to unity in the case of the use of the reaction products of dipropyl-ene-triamine with propionaldehyde and with butyraldehyde.

In the case of the use of the reaction product of dipropylene-triamine with benzaldehyde, there is found a percentage of dyestuff absorbed by the fiber of 1.8%. This value is clearly superior to that observed for the comparison (1.1%) mentioned in Example 2. It is effectively ascertained that this type of fiber is dyed in a very deep shade. The mechanical characteristics of the dyed filaments are not modified and correspond to those mentioned in Example 1.

EXAMPLE 5

The reaction product of 1 mol dipropylenetriamine and 1 mol formaldehyde used in Example 1 was replaced by the reaction product of 1 mol diethylenetriamine with 1 mol formaldehyde. All the other conditions of Example 1 remained unchanged.

The results obtained are comparable with those obtained in Example 1. The filaments are dyed in deep shades.

We claim:
1. An elastomeric filament having improved dyestuff affinity formed by spinning a solution of a substantially linear polyurethane product of the reaction of:
　(a) a prepolymer with terminal isocyanate groups obtained from the reaction of (1) at least one dihydroxyl compound selected from the group consisting of polyether glycols, polyester glycols, polyacetal glycols, polyester-amides containing hydroxyl groups, and mixtures of any of the foregoing, with (2) an excess of at least one diisocyanate of the general formula OCN—R—NCO, in which R is an aliphatic, aryl, or alkaryl radical, said prepolymer having a molecular weight between 500 and 5,000, and
　(b) a chain extender comprising a reaction product of of a dialkylene-triamine of the general formula:

$$H_2N—R'—NH—R''—NH_2$$

where R' and R", which may be the same or different, are straight chain or branched alkylene radicals containing up to 4 carbon atoms, with an aldehyde of the general formula R—CHO, in which R is a hydrogen atom or an alkyl, aryl or aralkyl radical, said triamine and said aldehyde being used in a molecular ratio of between 1:0.8 and 1:1.2 and said reaction components (a) and (b) also being used in a molecular ratio of between 1:0.8 and 1:1.2.

2. The product of claim 1 wherein the diamine is a lower alkyl diamine.

3. The product of claim 1 wherein the diamine is ethylene diamine.

References Cited

UNITED STATES PATENTS

| | | | |
| --- | --- | --- | --- |
| 3,021,307 | 2/1962 | Csendes | 260—72B |
| 3,355,431 | 11/1967 | Stewart | 260—75TNH |
| 3,356,650 | 12/1967 | McElroy | 260—77.5AP |
| 3,379,691 | 4/1968 | Sundholm | 260—75 |
| 3,401,133 | 9/1968 | Grace et al. | 260—77.5AM |
| 3,404,131 | 10/1968 | Taub | 260—77.5 |
| 3,412,071 | 11/1968 | Sundholm | 260—75 |

FOREIGN PATENTS

| | | | |
| --- | --- | --- | --- |
| 309,108 | 4/1929 | Great Britain | 260—72B |
| 1,034,263 | | Great Britain | 260—77.5 |

WILLIAM H. SHORT, Primary Examiner

E. WOODBERRY, Assistant Examiner

U.S. Cl. X.R.

260—75, 77.5, 78